United States Patent
Steiner et al.

(10) Patent No.: US 9,311,733 B2
(45) Date of Patent: Apr. 12, 2016

(54) EFFICIENT ROUND POINT RASTERIZATION

(71) Applicant: NVIDIA CORPORATION, Santa Clara, CA (US)

(72) Inventors: Walter R. Steiner, Flagler Beach, FL (US); Eric B. Lum, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 224 days.

(21) Appl. No.: 13/828,752

(22) Filed: Mar. 14, 2013

(65) Prior Publication Data

US 2014/0267382 A1 Sep. 18, 2014

(51) Int. Cl.
  *G09G 5/00* (2006.01)
  *G06T 11/40* (2006.01)
(52) U.S. Cl.
  CPC ...................................... *G06T 11/40* (2013.01)
(58) Field of Classification Search
  None
  See application file for complete search history.

(56) References Cited

U.S. PATENT DOCUMENTS

2002/0171665 A1*  11/2002  Ramani et al. ............... 345/611
2003/0234792 A1*  12/2003  Junkins et al. ............... 345/582
2010/0053205 A1*   3/2010  Brandwein .................. 345/619
2013/0342547 A1*  12/2013  Lum et al. ..................... 345/505

OTHER PUBLICATIONS

Dictionary.com, Definition of "point", http://dictionary.reference.com/browse/point.*

* cited by examiner

*Primary Examiner* — Xiao Wu
*Assistant Examiner* — Mohammad H Akhavannik
(74) *Attorney, Agent, or Firm* — Artegis Law Group, LLP

(57) ABSTRACT

One embodiment of the present invention sets forth a technique for improved rasterization of round points mapped into a tile space within a graphics processing pipeline. A set of candidate tiles are selected based on proximity to a round point. A tile within the set of candidate tiles may be rejected based on a rejection boundary. A tile may be rejected if no vertex associated with the tile is within the coverage area. Performance is improved by rejecting certain unneeded tiles that would otherwise be included in conventional rasterization. One embodiment advantageously enlists line drawing circuitry to determine whether a given tile intersects the coverage area.

22 Claims, 8 Drawing Sheets

EFFICIENT ROUND POINT RASTERIZATION

BACKGROUND OF THE INVENTION

1. Field of the Invention

The present invention generally relates to computer graphics and, more specifically, to efficient round point rasterization.

2. Description of the Related Art

Round points are an important primitive needed in certain types of graphics rendering applications, such as in rendering particle effects. In many common scenarios, particle effects involve a large number of individual particles. Throughput in such scenarios is an important graphics system benchmark.

Current graphics systems typically render a given round point by rasterizing the point as a set of samples within a rectangular bounding region established around the round point. A graphics system may map the rectangular region onto a set of one or more tiles in screen space, each of which may be completely covered, partially covered, or not covered by the round point. Rasterization efficiency is reduced when empty tiles within the rectangular bounding region are processed by a graphics pipeline within the graphics system. A typical graphics pipeline is designed for relatively balanced throughput at each pipeline stage, and inefficiency at any pipeline stage may reduce overall performance. Therefore, inefficient rasterization of round points may result in an overall reduction in performance, leading to poor system benchmark results.

Accordingly, what is needed in the art is more effective technique for round point rasterization.

SUMMARY OF THE INVENTION

One embodiment of the present invention sets forth a method for rasterizing a round point within a tile space, the method comprising generating an inclusion boundary based on a size and location for the round point, generating a candidate tile region based on the inclusion boundary, generating a rejection boundary based on the inclusion boundary, generating a set of rasterization tiles based on the candidate tile region and the rejection boundary, and rasterizing the set of rasterization tiles.

One advantage of the disclosed technique is that certain tiles that do not intersect a round point primitive may be rejected prior to rasterization, thereby improving overall system performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
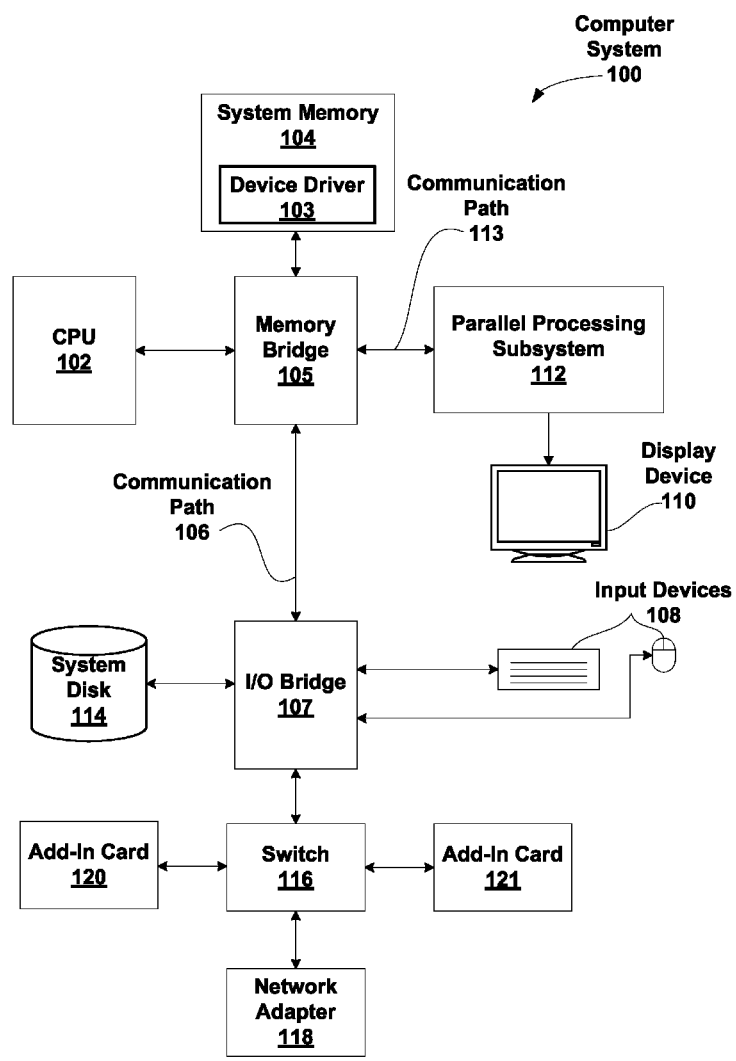
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
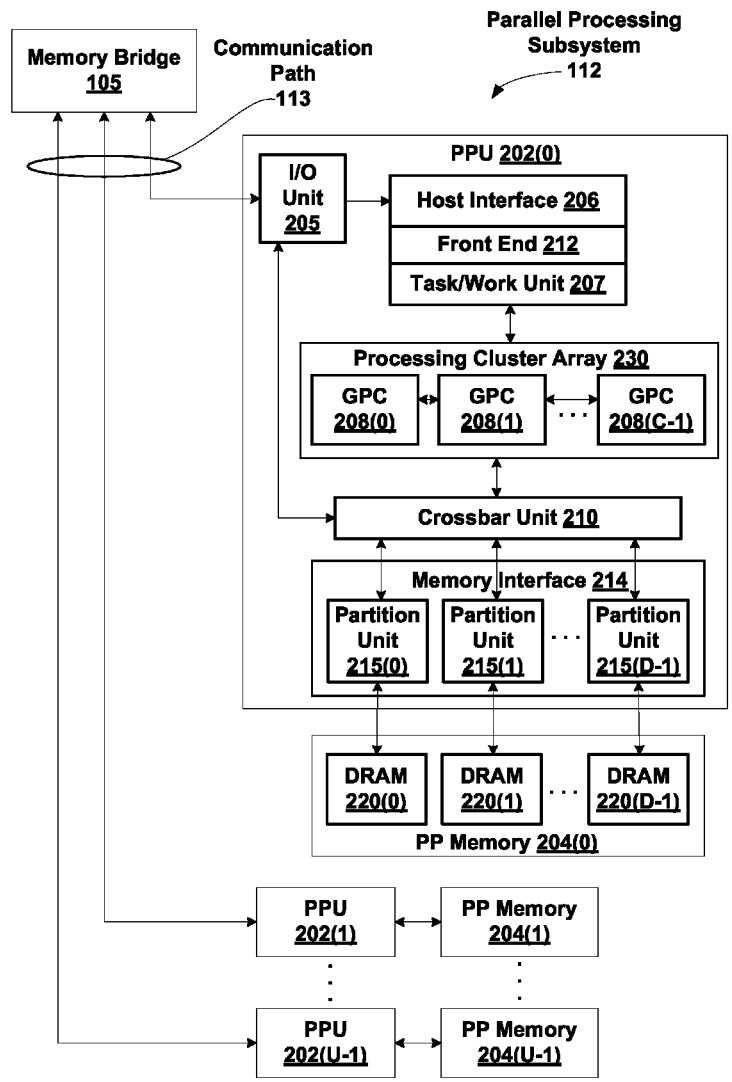
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as queue metadata (QMD) and stored in memory. The pointers to QMDs are included in the command stream that is stored as a pushbuffer and received by the front end unit 212 from the host interface 206. Processing tasks that may be encoded as QMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the QMDs is initiated. A priority may be specified for each QMD that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
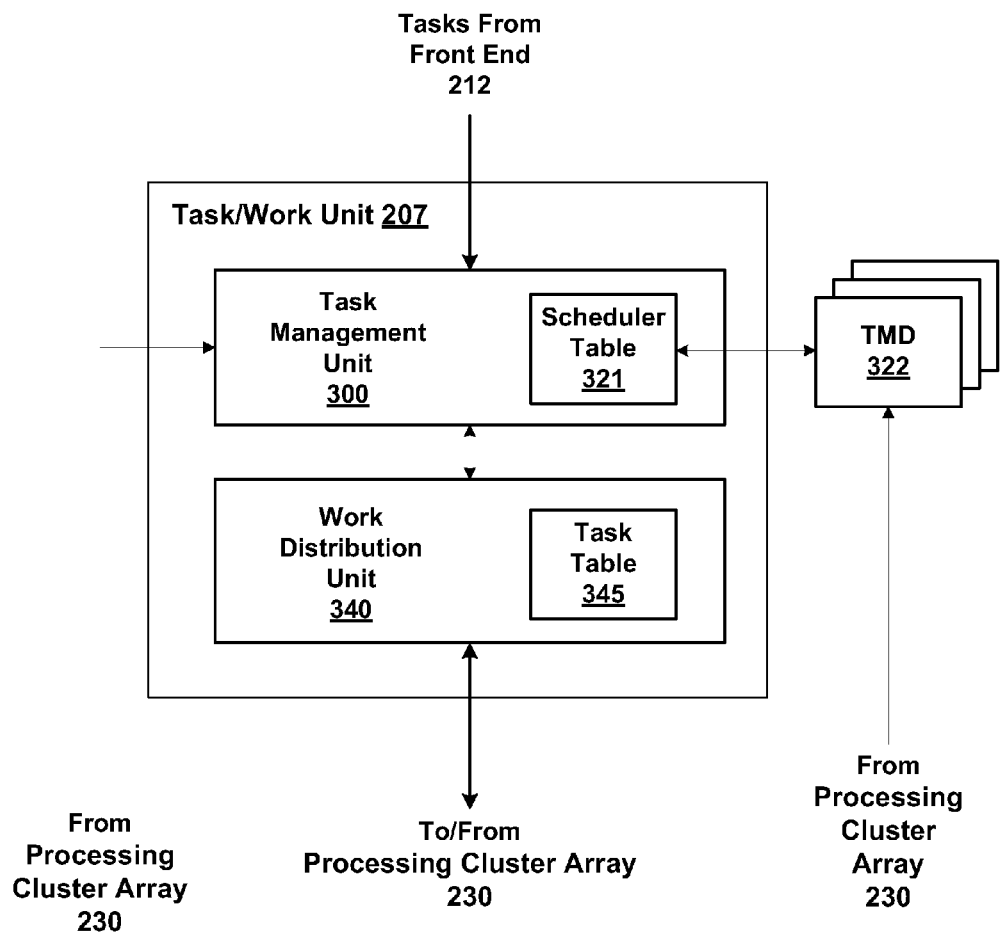
FIG. 3A is a block diagram of the Front End of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a linked list of pointers to the QMDs 322 corresponding to the tasks in the scheduler table 321. The QMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the QMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child task is added to a linked list in the scheduler table 321. A task is removed from a slot when the task is evicted.

Task Processing Overview

Figure 3B:
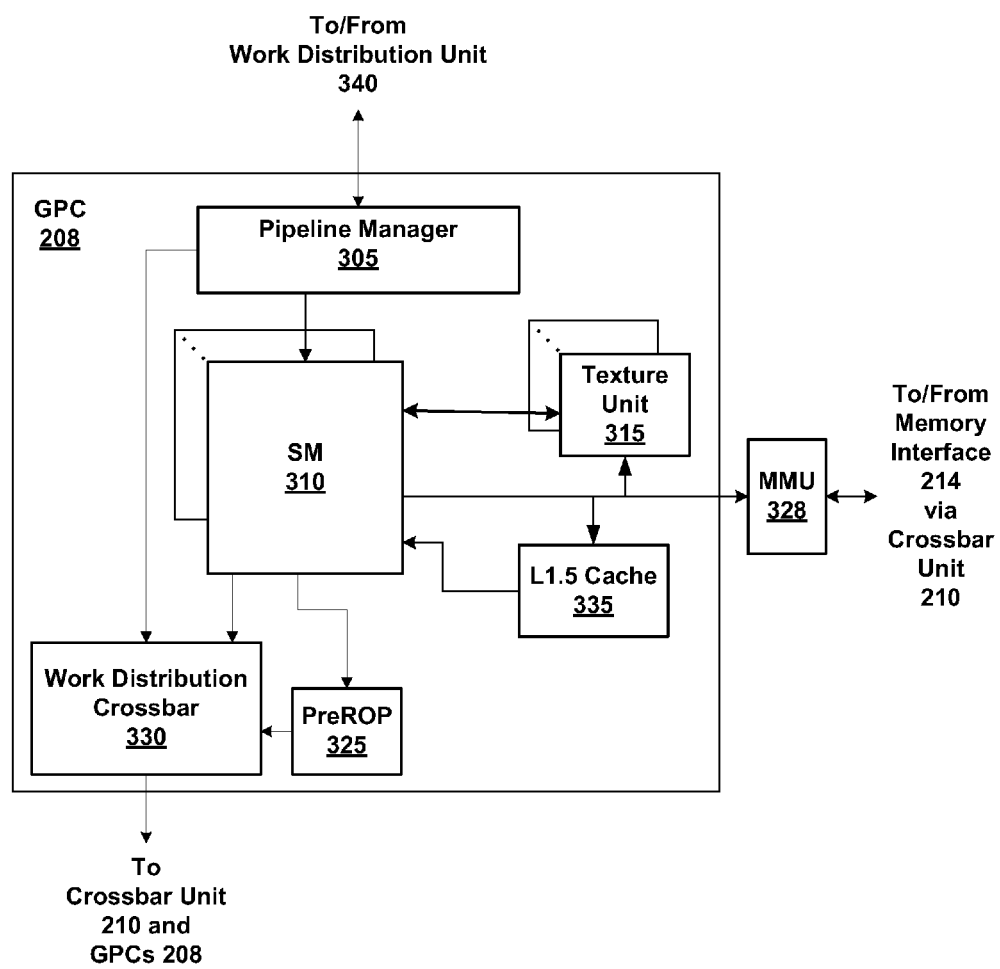
FIG. 3B is a block diagram of a GPC within one of the PPUs of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains an L1 cache (shown in FIG. 3C) or uses space in a corresponding L1 cache outside of the SM 310 that is used to perform load and store operations. Each SM 310 also has access to L2 caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
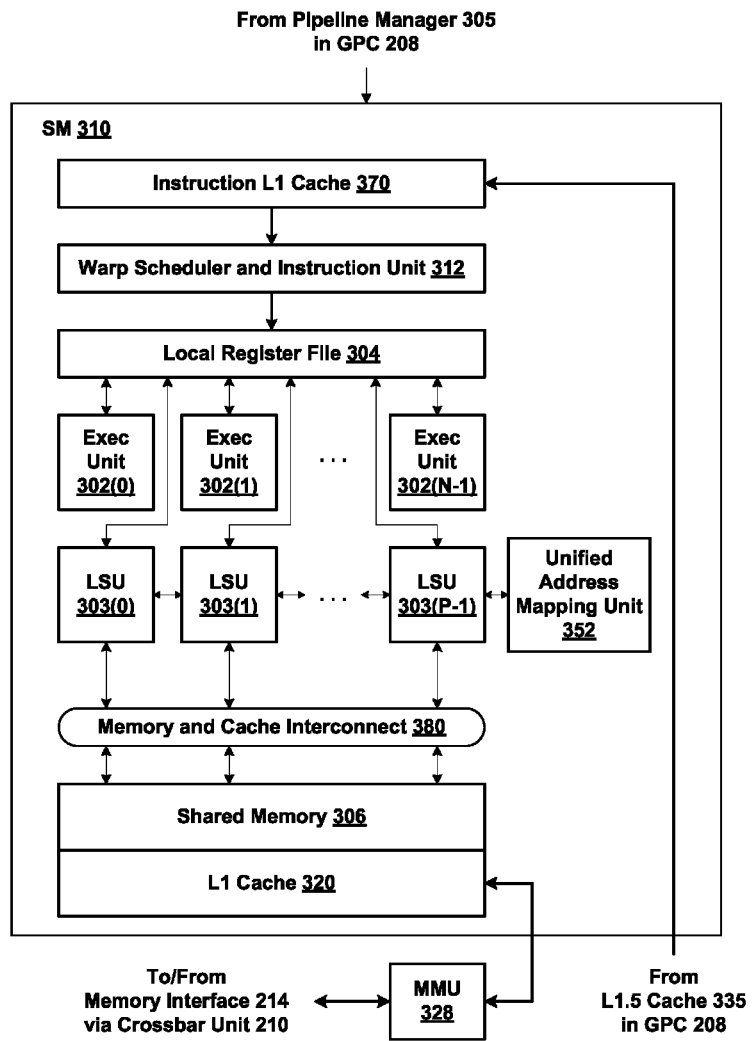
FIG. 3C is a block diagram of a portion of the SM of FIG. 3B, according to one embodiment of the present invention.

FIG. 3C is a block diagram of the SM 310 of FIG. 3A, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads in the same grid or queue (or by all LSUs 303) that store a CTA identifier, the CTA dimensions, the dimensions of a grid to which the CTA belongs (or queue position if a queue), and an identifier of the grid or queue to which the CTA belongs. CTAs that belong to a grid have implicit x,y,z parameters indicating the position of the respective CTA within the grid. Special registers are written during initialization in response to commands received via front end 212 from device driver 103 and do not change during execution of a processing task. The front end 212 schedules each processing task for execution as either a grid or queue. Each CTA is associated with a specific grid or queue for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
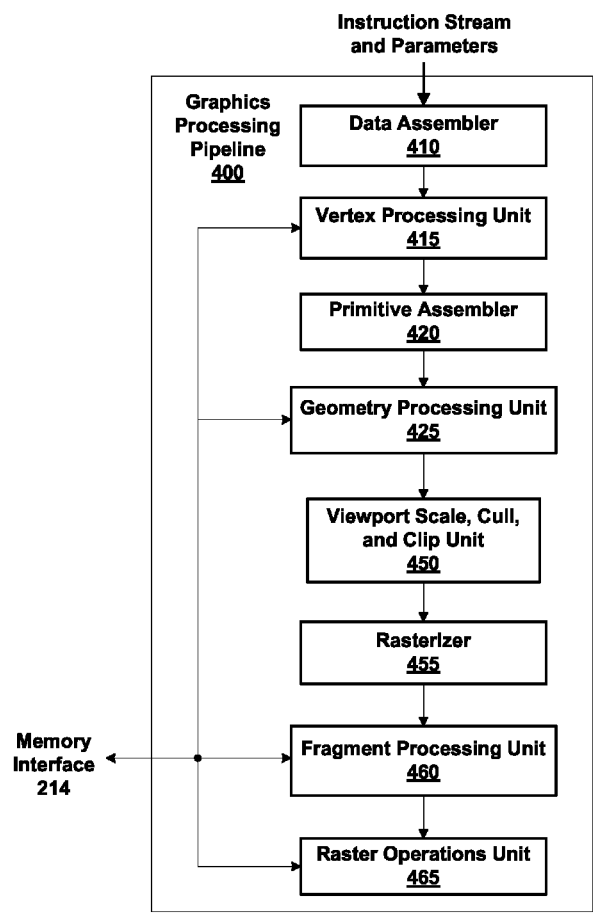
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Efficient Round Point Rasterization

Figure 5:
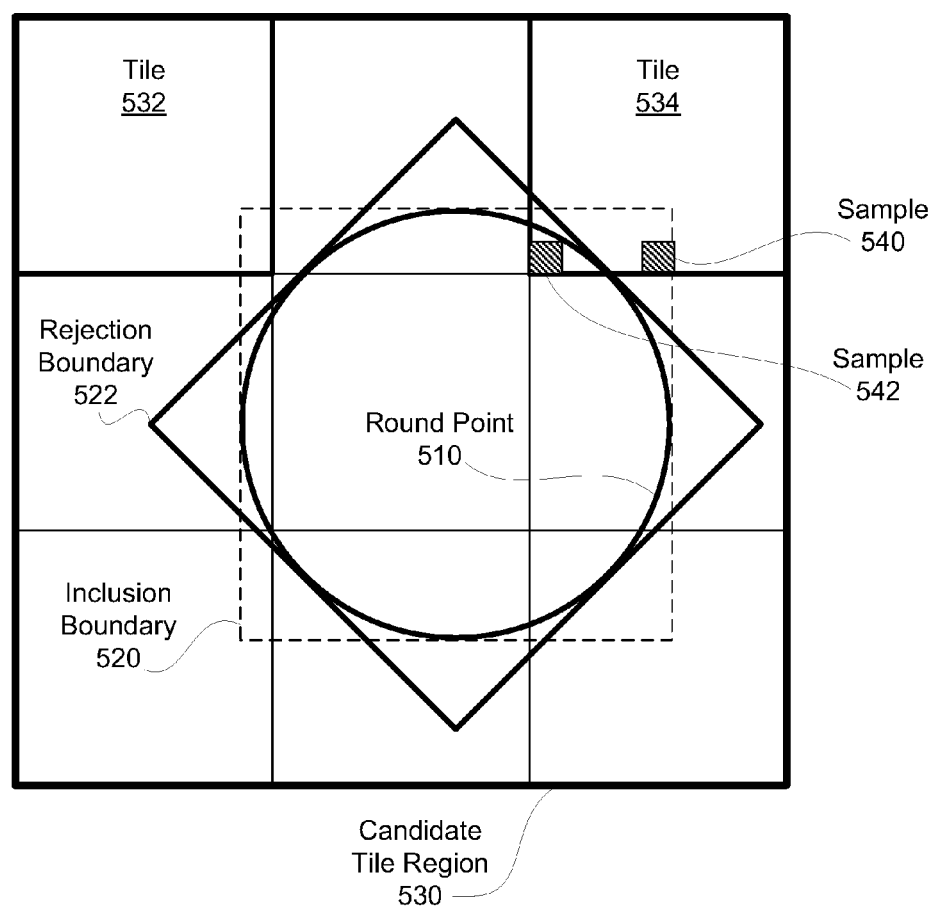
FIG. 5 illustrates determining which tiles do not intersect a round point, according to one embodiment of the present invention.

FIG. 5 illustrates determining which tiles do not intersect a round point 510, according to one embodiment of the present invention. Each tile may define any technically feasible geometry, such as a rectangular region in screen space. In one embodiment, each tile comprises a rectangular region that includes two horizontal samples by four vertical samples. In another embodiment, each tile comprises a square region that includes eight horizontal samples by eight vertical samples. An inclusion boundary 520 defines a rectangular region that encompasses round point 510. As shown, inclusion boundary 520 may intersect of round point 510 along orthogonal extremes. A candidate tile region 530 comprises each tile within screen space that that intersects inclusion boundary 520. Candidate tile region 530 therefore includes all tiles that intersect round point 510, however a given tile within candidate tile region 530 or may not actually intersect round point 510.

A rejection boundary 522 is defined by rotating inclusion boundary 520 by 45 degrees about the center of round point 510. Tiles within the candidate tile region 530 that are completely outside rejection boundary 522 do not intersect or cover round point 510 and are therefore not needed for rendering round point 510. For example, tile 532 and tile 534 both intersect inclusion boundary 520 and are both included within candidate tile region 530. Tile 532 is completely outside rejection boundary 522 and therefore does not intersect or cover round point 510. As a consequence, tile 532 can be rejected and not processed during rasterization of round point 510. By contrast, tile 534 is partially inside rejection boundary 522 and needs to be processed during rasterization of round point 510.

As shown, sample 540 within tile 534 does not cover round point 510 and may be rejected during a detailed rasterization phase of tile 534. Sample 542 covers a portion of round point 510 and should be included during the detailed rasterization phase of tile 534.

In one embodiment, graphics processing pipeline 400 of FIG. 4 is configured to process round point 510 as a geometric primitive. Furthermore, inclusion boundary 520 is computed to determine candidate tile region 530, and rejection boundary 522 is computed to perform trivial rejection of tiles that do not cover round point 510. Geometric parameters may be computed for inclusion boundary 520 and rejection boundary 522 within any technically feasible stage of graphics processing pipeline 400. For example, the geometric parameters may be computed within geometry processing unit 425. In certain embodiments, geometry processing unit 425 is configured to receive round point 510 as a primitive and to compute inclusion boundary 520 and rejection boundary 522. Viewport scale, cull, and clip unit 450 may be configured to discard tiles outside rejection boundary 522 and raster 455 may be configured to discard samples outside round point 510.

Persons skilled in the art will recognize that other graphics processing pipelines may be similarly configured, such as via tile rasterization, to compute a candidate tile region 530 comprising tiles based on inclusion boundary 520, and to reject tiles based on rejection boundary 522. Detailed rasterization may then compute which individual samples should be included during rasterization of round point 510 and which samples should not be included.

In one embodiment, each tile includes a two by four region of aliased samples. Here, a transparency value is computed for each sample that at least partially covers round point 510, based on geometric coverage of round point 510 with respect to the sample. In such embodiments, a smooth round point is computed within an aliased screen space. In an alternative embodiment, each tile includes an eight by eight region of samples used to generate one or more pixels within an anti-aliased screen space.

Certain configurations of graphics processing pipeline 400 implement line drawing logic that specifies a line as four vertices that define a coverage region for the line. The line drawing logic uses the four vertices to determine whether a candidate point is within the coverage region of the line or outside the coverage region for the line. The line drawing logic may also determine a coverage ratio for the candidate point with respect to the line. In one embodiment, rejection boundary 522 defines the four vertices for the line and the line drawing logic is configured to determine whether a given tile intersects rejection boundary 522 by specifying each vertex of the tile as a candidate point to the line drawing logic. If all tile vertices are outside the coverage region for the line, then the tile is rejected. Otherwise, if any tile vertex is within the coverage region for the line, then the tile is not rejected and is included rasterization of round point 510.

Figure 6:
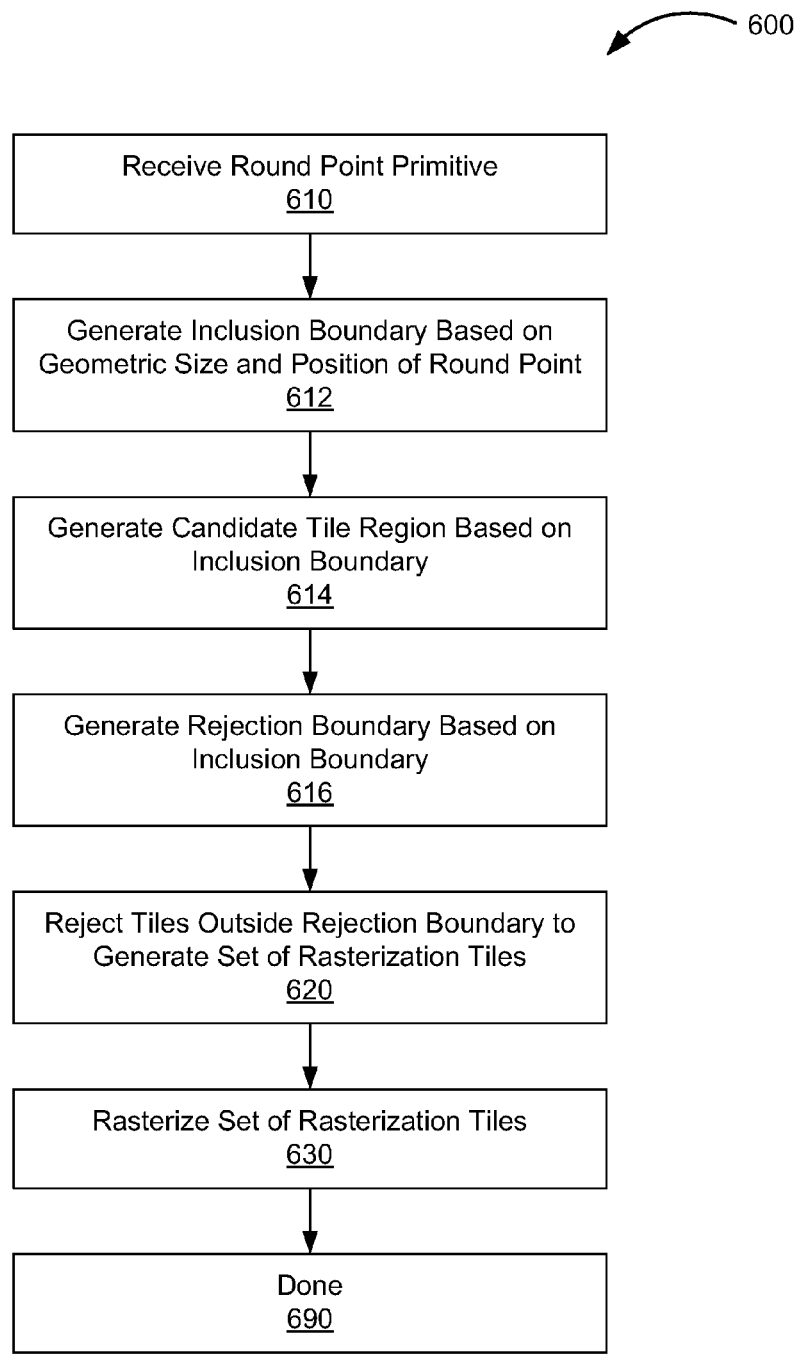
FIG. 6 is a flow diagram of method steps for rasterizing a round point projected into tile space surface, according to one embodiment of the present invention.

FIG. 6 is a flow diagram of method steps for rasterizing a round point projected into tile space surface, according to one embodiment of the present invention. In sum, tiles within the tile space surface that do not intersect the round point are rejected for consideration when rasterizing the round point, thereby increasing overall performance. Although the method steps are described in conjunction with the systems of FIGS. 1-4, persons skilled in the art will understand that any system configured to perform the method steps, in any order, is within the scope of the present invention.

As shown, a method 600 begins in step 610, where the graphics processing pipeline, such as graphics processing pipeline 400, receives a round point primitive. The round point primitive, such as round point 510 of FIG. 5, is specified to have a geometric size, such as a diameter, and location within the tile space. In step 612, the graphics processing pipeline generates an inclusion boundary, such as inclusion boundary 520, based on the geometric size and location of the round point within the tile space. In step 614, the graphics processing pipeline generates a candidate tile region, such as candidate tile region 530, based on the inclusion boundary. In step 616, the graphics processing pipeline generates a rejection boundary, such as rejection boundary 522, based on the inclusion boundary. In one embodiment, the rejection boundary is specified as four vertices that define a line within a line drawing function.

In step 620, the graphics processing pipeline rejects tiles that are outside the rejection boundary to generate a set of intersecting tiles. The set of rasterization tiles comprises tiles that very likely intersect the round point primitive with a coverage having at least one sample requiring rasterization. In step 630, the graphics processing pipeline rasterizes the set of rasterization tiles. The method terminates in step 690.

One advantage of the present invention is that certain tiles that do not intersect a round point primitive may be rejected prior to rasterization, thereby improving overall system performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for rasterizing a round point primitive within a tile space, the method comprising:
    generating an inclusion boundary based on a size and a location for the round point primitive;
    generating a candidate tile region based on the inclusion boundary;
    generating a rejection boundary based on a rotation of the inclusion boundary;
    generating a set of rasterization tiles based on the candidate tile region and the rejection boundary; and
    rasterizing the set of rasterization tiles.

2. The method of claim 1, wherein the inclusion boundary intersects orthogonal extremes of the round point primitive.

3. The method of claim 1, wherein generating the rejection boundary comprises rotating the inclusion boundary about a center point of the round point primitive.

4. The method of claim 1, wherein the candidate tile region defines a set of candidate tiles that intersect the inclusion boundary.

5. The method of claim 4, wherein generating the set of rasterization tiles comprises culling each tile from the set of candidate tiles that does not intersect the rejection boundary.

6. The method of claim 5, wherein culling each tile comprises:
    configuring a drawing unit to determine whether a vertex associated with the tile is within a covered region defined by the rejection boundary; and
    determining that no vertex associated with the tile is within the covered region.

7. The method of claim 6, wherein the drawing unit comprises a line drawing unit.

8. The method of claim 4, wherein generating the set of rasterization tiles comprises determining the set of candidate tiles that intersect the inclusion boundary; and determining which tiles in the set of candidate tiles do not intersect the rejection boundary.

9. A non-transitory computer-readable medium that includes instructions that, when executed by a processing unit, cause the processing unit to rasterize a round point primitive within a tile space, by performing the steps of:
    generating an inclusion boundary based on a size and a location for the round point primitive;
    generating a candidate tile region based on the inclusion boundary;
    generating a rejection boundary based on a rotation of the inclusion boundary;
    generating a set of rasterization tiles based on the candidate tile region and the rejection boundary; and
    rasterizing the set of rasterization tiles.

10. The non-transitory computer-readable medium of claim 9, wherein the inclusion boundary intersects orthogonal extremes of the round point primitive.

11. The non-transitory computer-readable medium of claim 9, wherein generating the rejection boundary comprises rotating the inclusion boundary about a center point of the round point primitive.

12. The non-transitory computer-readable medium of claim 9, wherein the candidate tile region defines a set of candidate tiles that intersect the inclusion boundary.

13. The non-transitory computer-readable medium of claim 12, wherein generating the set of rasterization tiles comprises culling each tile from the set of candidate tiles that does not intersect the rejection boundary.

14. The non-transitory computer-readable medium of claim 13, wherein culling each tile comprises:
configuring a drawing unit to determine whether a vertex associated with the tile is within a covered region defined by the rejection boundary; and
determining that no vertex associated with the tile is within the covered region.

15. The non-transitory computer-readable medium of claim 14, wherein the drawing unit comprises a line drawing unit.

16. A system, comprising:
a processing unit configured to rasterize a round point primitive within a tile space by:
generating an inclusion boundary based on a size and a location for the round point primitive;
generating a candidate tile region based on the inclusion boundary;
generating a rejection boundary based on a rotation of the inclusion boundary;
generating a set of rasterization tiles based on the candidate tile region and the rejection boundary; and
rasterizing the set of rasterization tiles.

17. The system of claim 16, wherein the inclusion boundary intersects orthogonal extremes of the round point primitive.

18. The system of claim 16, wherein generating the rejection boundary comprises rotating the inclusion boundary about a center point of the round point primitive.

19. The system of claim 16, wherein the candidate tile region defines a set of candidate tiles that intersect the inclusion boundary.

20. The system of claim 19, wherein generating the set of rasterization tiles comprises culling each tile from the set of candidate tiles that does not intersect the rejection boundary.

21. The system of claim 20, wherein culling each tile comprises:
configuring a drawing unit to determine whether a vertex associated with the tile is within a covered region defined by the rejection boundary; and
determining that no vertex associated with the tile is within the covered region.

22. The system of claim 16, further comprising a memory that includes instructions that, when executed by the processing unit, cause the processing unit to generate the inclusion boundary, generate the candidate tile region, generate the rejection boundary, generate the set of rasterization tiles, and rasterize the set of rasterization tiles.

* * * * *